July 14, 1964  G. R. CURTIS  3,140,510
METHOD FOR HANDLING MEAT PRODUCTS
Filed March 13, 1961  4 Sheets-Sheet 1
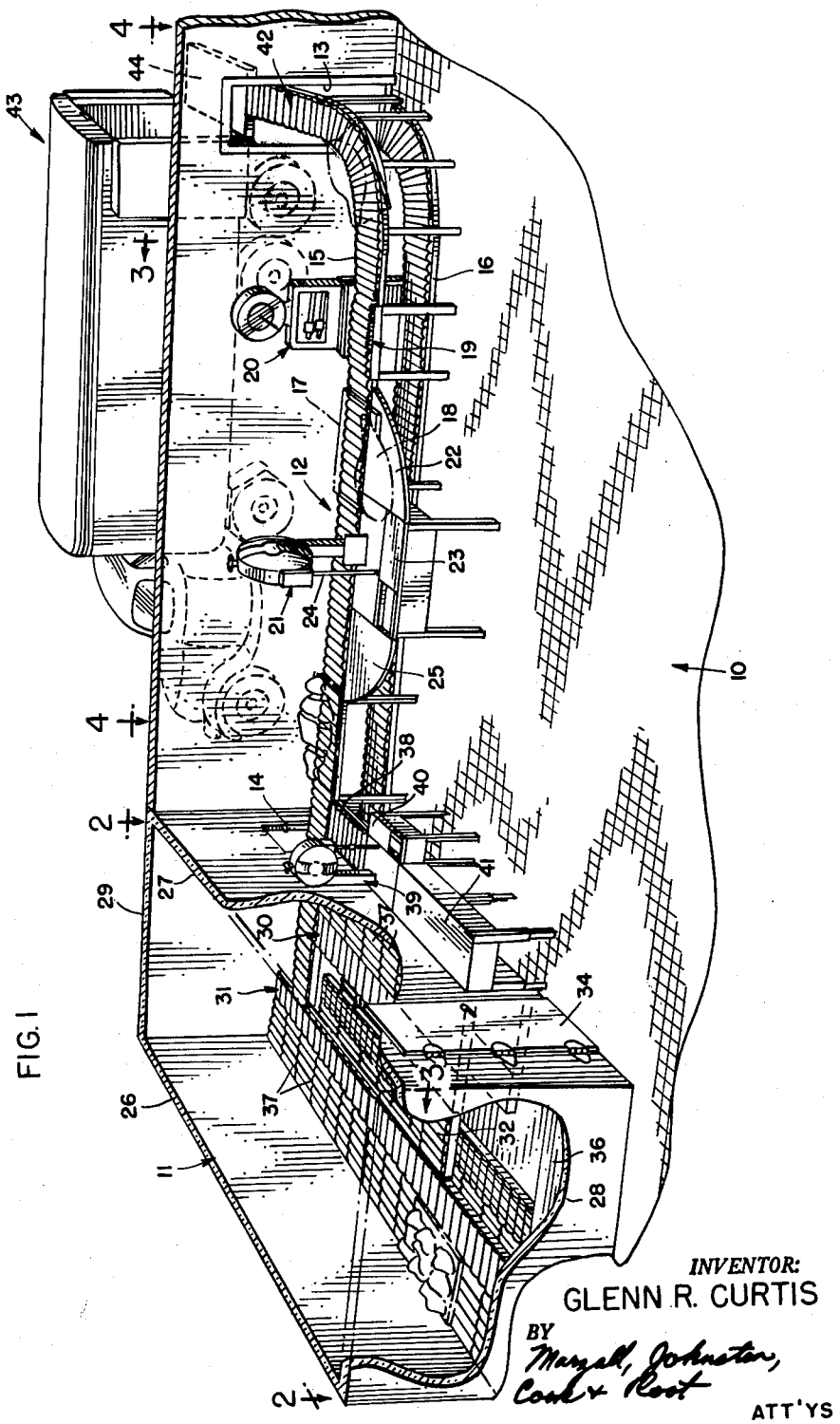
FIG. I
INVENTOR:
GLENN R. CURTIS
BY
ATT'YS

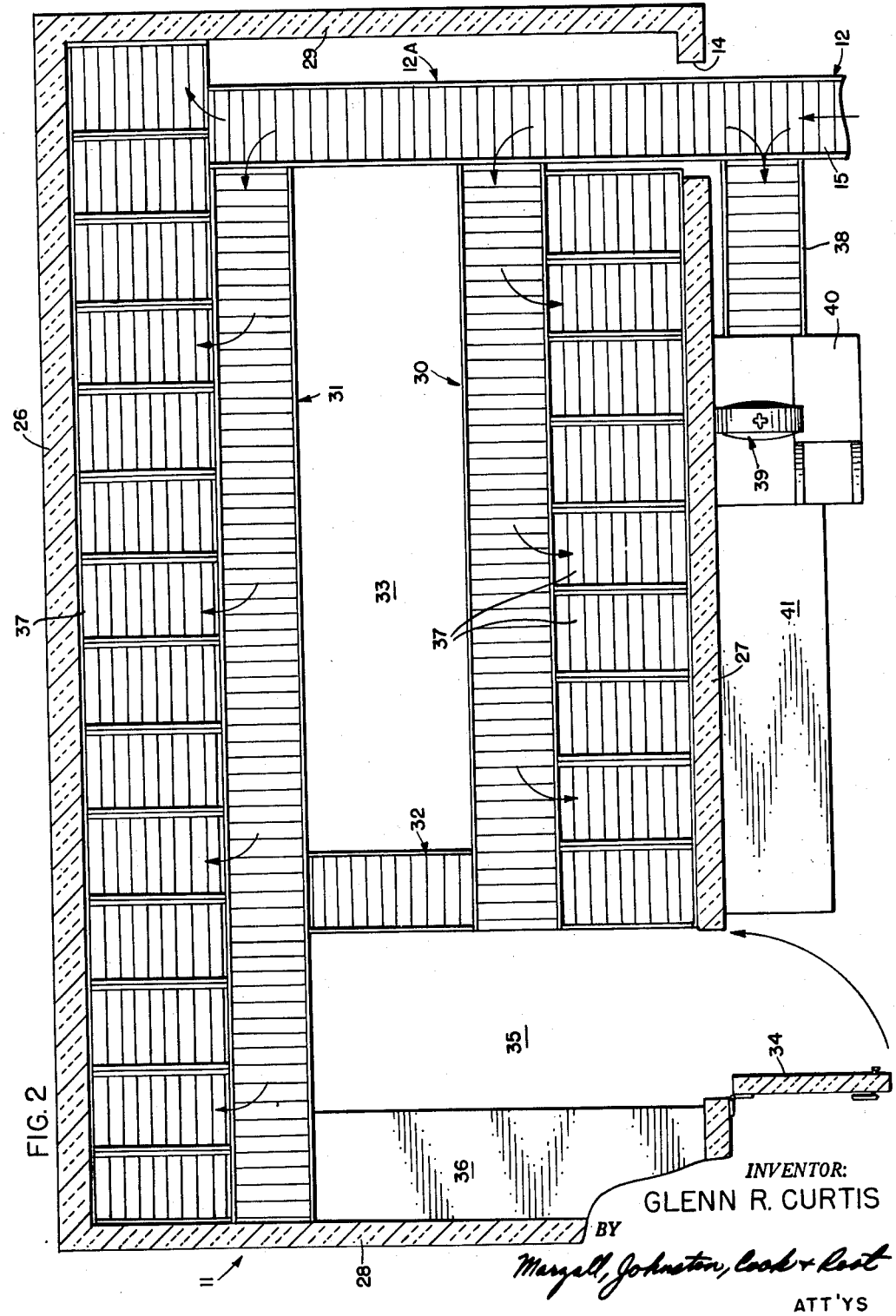

July 14, 1964     G. R. CURTIS     3,140,510
METHOD FOR HANDLING MEAT PRODUCTS
Filed March 13, 1961     4 Sheets-Sheet 3
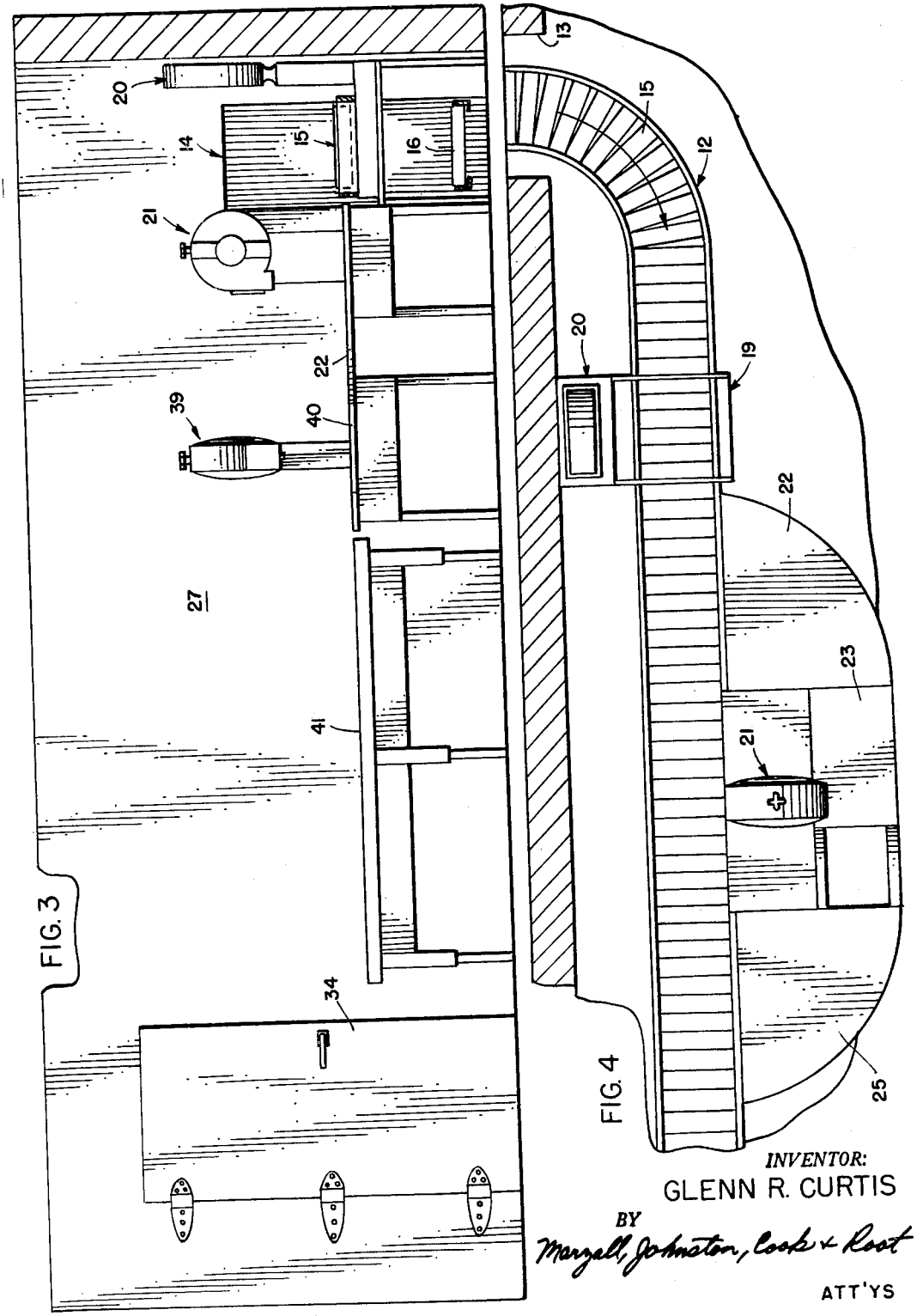
*INVENTOR:*
GLENN R. CURTIS
BY
*Mergell, Johnston, Cook & Root*
ATT'YS

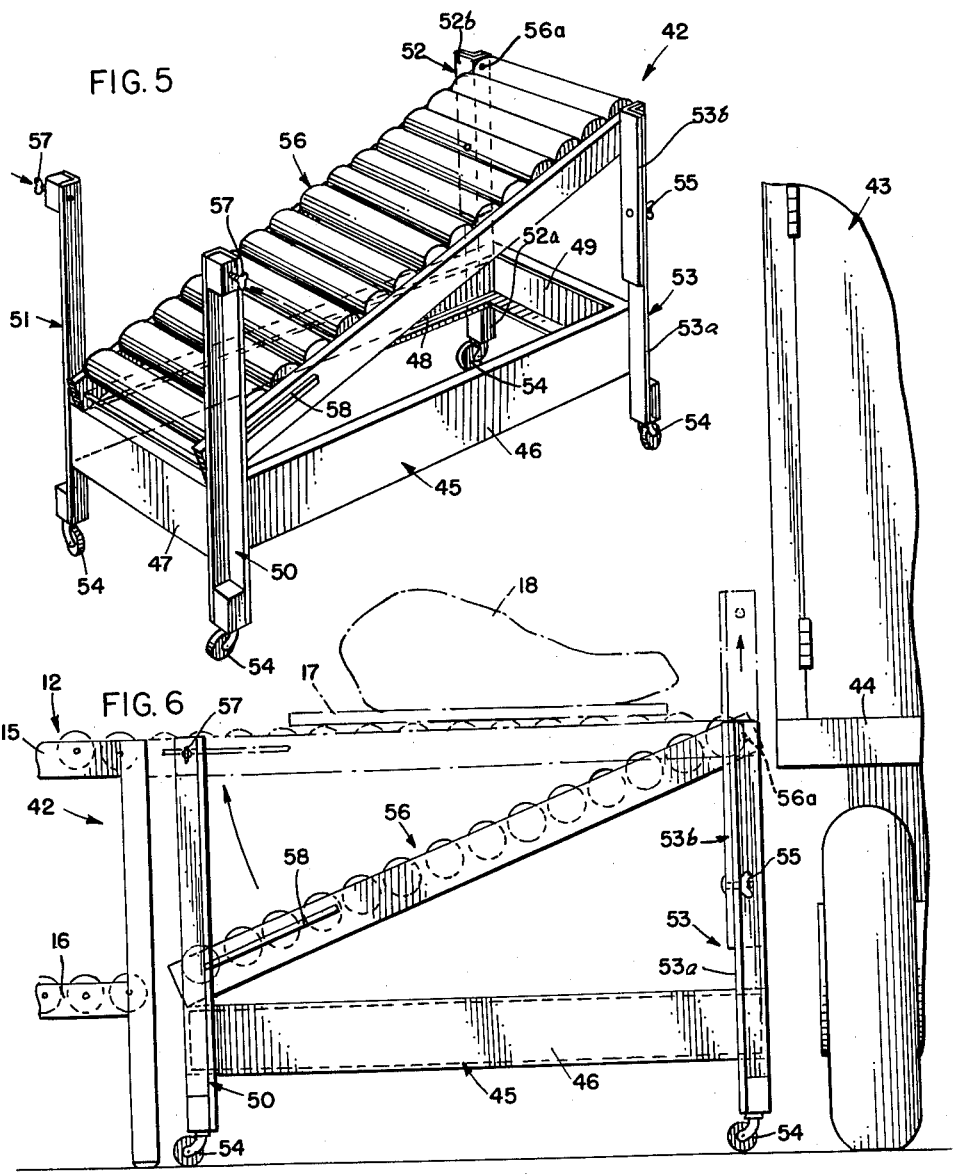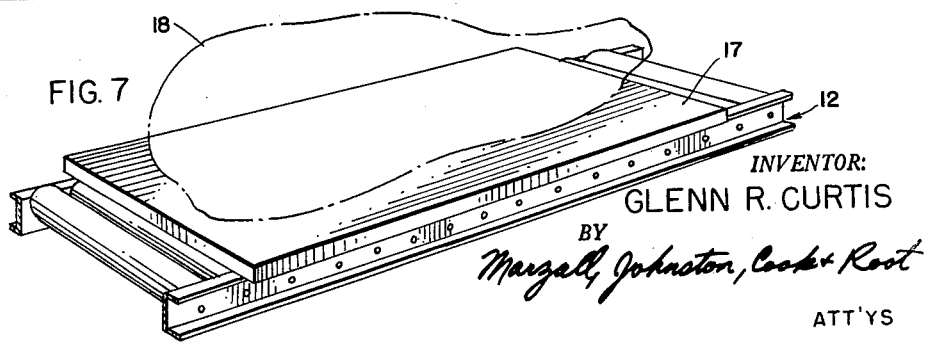

3,140,510
METHOD FOR HANDLING MEAT PRODUCTS
Glenn R. Curtis, Evanston, Ill., assignor to Independent Grocers' Alliance Distributing Co., Chicago, Ill., a corporation of Illinois
Filed Mar. 13, 1961, Ser. No. 95,178
2 Claims. (Cl. 17—45)

This invention relates to a method and apparatus for handling meat products, and more particularly to a method and apparatus especially useful in receiving meat deliveries at a retail store.

Meat is delivered to retail stores in many variations of shapes, sizes and containers. And due to discrepancies which occur between the shipper and the receiver, it has been, and still is, in accordance with good business procedures advisable to weight and/or count the meat shipments. Meat requires storage in refrigerated holding rooms, commonly referred to as meat coolers, to assure its quality and sales appeal for an extended period of time. From time to time, depending upon the demand for the meat, the basic meat units must be removed from the cooler and divided into smaller primal and salable units. Generally, after the basic meat unit has been divided or cut up into primal units, some of the primal units are returned to the cooler and stored, while the units needed at that time are further cut down into salable units, wrapped, weighed and displayed for sale. Thus, processing and preparing meat for sale requires laborous, time-consuming and costly handling procedures.

Heretofore, meat handling procedures have depended upon the arrangement of equipment and facilities for handling meat and have been time-consuming, costly and inefficient. An example of a common accepted meat handling procedure includes the necessity of the delivery man to climb from ground level into a refrigerated meat truck and then gathering of the items to be delivered on the rear end of the truck so that they can be reached when he descends to the ground. It is well known that beef is difficult to handle due to its awkward shape and its weight, but for convenience of handling the beef carcass is usually cut into quarters which usually weigh between one hundred twenty five to two hundred pounds. Upon descending to the ground, the delivery man must unload the quarter of beef on his shoulder and carry it into a store through a door that is usually not more than thirty six inches wide. The first step accomplished after bringing the meat into the store is to check its weight on a scale which is usually of the beam type hingedly secured to a wall. A hook is provided on the scale for receiving the meat and inasmuch as the scale is generally free swinging, difficulty is encountered in placing the meat on the hook and removing it therefrom which normally necessitates the efforts of two men. After the weighing operation, the beef is then carried into a meat cooler, again through a door usually about thirty six inches wide, and hung on a hook fastened to a rail or the ceiling within the cooler. Subsequently, when it is desired to break the quarters down into primal cuts, it is necessary to remove the beef from the hook in the cooler and place it in a meat cutting room where the cutting operation may be accomplished. The pieces of meat not needed are then returned to the cooler for subsequent storage, while the pieces desired are further cut into salable sizes and placed on sale.

The present invention overcomes the difficulties heretofore encountered in the handling of meat products, and permits a more efficient and economical manner of handling meat at a retail store. Specifically, a meat handling room and meat cooler is provided wherein the meat products are delivered into the meat handling room on a conveyer, weighed while on the conveyer, advanced to a meat cutting station where the meat is divided into primal cuts, and then advanced along the conveyer into the meat cooler for storage purposes. The meat handling room additionally includes other meat cutting facilities for reducing the primal cuts into salable units wherein the primal cuts may be transported from the meat cooler on the conveyer and into the meat handling room to the secondary meat cutting station.

It is therefore an object of this invention to provide a new and improved method and apparatus for handling meat products more quickly and efficiently.

Another object of this invention is in the provision of a method and apparatus for receiving meat deliveries in a retail store wherein the meat handling and receiving time is materially reduced, thereby reducing the labor involved in handling of the meat.

Still another object of this invention resides in the provision of a method and apparatus for receiving meat deliveries in a retail store which permits immediate and easy weighing of the meat, and immediate and easy breakdown of basic meat units into primal cuts, and to further reduce the number of meat handling persons needed for effectively accomplishing the meat handling operation.

A further object of this invention is to provide a new and improved method and apparatus for handling meat products at a retail store including a meat cooler having means for allowing greater utilization of the cooler space.

Still a further object of this invention is to provide a method and apparatus for receiving meat deliveries in a retail store and for handling the meat up to the sale thereof, wherein less handling of the meat by the butcher in cutting same up into salable units is accomplished.

Other objects, features and advantages of the invention will be apparent from the following detailed disclosure, taken in conjunction with the accompanying sheets of drawings, wherein like reference numerals refer to like parts, in which:

FIG. 1 is a perspective view of a building having parts broken away for clarification purposes wherein the invention is associated therewith, and illustrating the overall situation in receiving of meat deliveries at a retail store;

FIG. 2 is an enlarged top plan view of primarily the meat cooler, taken substantially along line 2—2 of FIG. 1 and looking in the direction of the arrows;

FIG. 3 is an enlarged elevational view, partly in section, and taken along line 3—3 of FIG. 1;

FIG. 4 is a detailed top plan view of the conveyer which extends through the meat handling room and illustrating the relative positioning of the meat weighing mechanism and the meat saw;

FIG. 5 is a perspective view of a portable roller conveyer section adapted for use in bridging the gap between the truck and a conveyer in the meat handling room for facilitating the unloading of meat from the truck;

FIG. 6 is a side elevational view of the portable conveyer section of FIG. 5 showing it in position between a truck and the conveyer in the meat handling room, and showing in phantom the second position for the roller section; and FIG. 7 is a perspective view of a section of the roller conveyer having thereon a pallet of the type used for supporting meat upon the conveyer.

Although the present invention is illustrated and will be described as most generally applicable for use in the receiving and handling of meat products at a retail store, it should be appreciated that other uses and purposes of the invention will be apparent to one skilled in the art. However, the present invention is largely useful in connection with receiving shipments of meat products as unloaded from a refrigerated meat truck, wherein it is desired to weigh the meat products, divide them into primal cuts where desired, and to transport same into a meat storage cooler.

Referring now to the drawings, and particularly to FIG. 1, a building such as a retail store would be provided with a meat handling room 10, a meat cooler 11, and a conveyer 12 of any desirable type.

The conveyer 12 extends generally from an inlet or opening 13 in the meat handling room providing access to the outer loading and unloading area of the store through the meat handling room and into the meat cooler through an opening or inlet 14. The conveyer 12 is preferably of a standard well known type and especially a roller conveyer wherein the rollers are mounted adjacent and parallel to one another between opposed frame flanges, and are preferably idly supported. In this instance it is generally necessary to provide some external power for moving items therealong, and in this case the power may be that of an operator wherein the control of movement of the items may be closely guarded. However, a slight grade may be applied to the conveyer between the opening 13 and the opening 14 to provide a gravity feed of the items thereon in the direction of the meat cooler. Thus, the sections of the roller conveyer at the opening 13 would be slightly higher than at the opening 14. Moreover, the conveyer 12 may include an upper run 15 and a lower run 16 wherein it may be desired to send meat products and items of one type along the upper run and meat products and items of another type along the lower run. Particularly, quarters of beef could be advanced along the upper run while meat products and the like packaged in containers may be advanced along the lower run and directly into the meat cooler. But the meat products advanced along the upper run could be weighed and further cut into smaller pieces if so desired. Both runs may be graded to provide gravity feed of meat products in the direction of the meat cooler.

In order to facilitate the handling of basic meat units such as quarters of beef and the like, pallets or skids are provided to support the meat on the conveyer. As seen particularly in FIG. 7, a pallet 17 is shown on a section of the conveyer 12 and upon which is supported a quarter of beef 18. Although the pallet 17 may be made of any desired material and of any desired shape, it is preferable to have it rectangularly shaped of approximately a three foot length, a twenty inch width and a one and one-eighth inch thickness, and still more preferably the pallets will be made of solid, hard rubber. The width dimension of the pallet is such that it may slightly overlap the edges of the rollers on the conveyer 12 which may be approximately eighteen inches wide.

As a meat loaded pallet enters the opening 13, it travels along a curved section and is received on a movable weighing section 19. If necessary or desired, guides may be provided at the curved section in order to guard against the meat loaded pallet continuing in such a direction as to be displaced from the conveyer 12. It should be appreciated that the curved section may be eliminated if the conveyer were to come in through a wall perpendicularly extending to the wall having the opening 13. The movable weighing section 19 is secured to the scale platform of a scale 20 at the weighing station in order to weigh the meat as it passes over the section 19. The section 19 is slightly higher than the adjacent sections of the conveyer 12 so that the pallet may overhang the section rollers and not touch adjacent rollers which would affect the weighing results. It should be appreciated that the weight of the pallet would be considered and the scale be so adjusted as to only reflect the weight of the meat thereon. Further, the size of the movable section 19 would be such as to properly accommodate the pallet size.

After the weighing operation has been completed, the operator in the meat handling room would then advance the meat loaded pallet to the meat cutting station where a large meat saw 21 is provided adjacent to the conveyer 12. At the end of the saw adjacent the scale, an inlet table or platform 22 is provided upon which the meat may be loaded after being removed from the pallet. The saw may be of any desired, well known type and preferably having a reciprocatably mounted table 23 upon which the meat may be placed and successively moved relative to the saw blade 24 to cut the quarter or basic meat unit down to primal cuts such as ribs, chucks, etc. Preferably, the basic unit would be cut into four or five pieces and the saw 21 may be defined as a breakdown saw which effectively breaks the quarters down to primal cuts. At the end of the saw 21 remote from the scale 19 and adjacent to the meat cooler 11, a discharge table 25 is provided upon which the primal cuts may be placed after the cutting operations. The pallet from which the quarter had been removed at the inlet table 22 would be advanced toward the meat cooler and in alignment with the discharge table 25 so that the primal cuts may then be loaded onto the pallet for subsequent transfer through the opening 14 and into the meat cooler 11. It should be appreciated that the handling of the meat and pallet along the conveyer may be easily and efficiently done by a single person who would man the weighing station, advance the pallet and meat along the conveyer, and man the meat cutting station. A flexible curtain or the like (not shown) may be provided in the opening 14 to effectively form a door in the opening and seal the opening but permit movement of meat and pallets therethrough.

Referring now particularly to FIGS. 1 and 2, it will be seen that the roller conveyer 12 continues from the meat handling room through the meat cooler loading entrance 14 and terminates within the meat cooler room short of a wall 26. The meat cooler room additionally includes a wall 27 opposed to the wall 26 and end walls 28 and 29. Within the meat cooler 11, the conveyer 12 is designated by the numeral 12A and this section extends parallel to the end wall 29 and closely adjacent thereto. Extending from the intermediate area of the conveyer section 12A and perpendicular thereto is a distributor conveyer section 30, while a second distributor conveyer section 31 extends from the end of the section 12A and perpendicular thereto. Thus, the conveyer distributor sections 30 and 31 are arranged in parallel relation to each other and to the opposing walls 26 and 27. The conveyer section 31 extends between the end of the conveyer section 12A and the end wall 28, while the conveyer section 30 extends from the conveyer section 12A to a point somewhat short of the wall 28. At the end of the distributor conveyer section 30 opposite from the end that connects to the conveyer section 12A is a connecting conveyer section 32 which extends perpendicular to the sections 30 and 31 and therebetween and provides a communication between these two sections. This section 32 along with the sections 30 and 31 and a portion of the section 12A coact to define a working area 33 for an operator who would handle the distribution of the meat loaded pallets within the meat cooler. Preferably, the connecting section 32 would be hinged at one end so that it may be swung upwardly and downwardly into position to facilitate entry of a person into the work area 33.

In the wall 27 adjacent to the wall 28, a door 34 is provided to permit the entry of a person into the meat cooler and in some instances for placing meat in the cooler and removing it therefrom, although normally the meat will be removed on pallets through the opening 14 on the conveyer. The door 34 opens to a walkway 35 which permits access to the necessary parts of the meat cooler room and to the area adjacent the connecting conveyer section 32. A blooming table 36 extends along the end wall 28 and between the wall 27 and the conveyer section 31 and along the walkway 35. This blooming table is useful in storing salable cuts of meat prior to wrapping thereof to allow the meat to regain a natural red color lost by fat smudging during the meat cutting operations on the meat saws.

Along the walls 26 and 27 and between these walls and the adjacent conveyer sections 30 and 31 are provided a plurality of storage shelves 37 for receiving and storing meat loaded pallets thereon. Each of these shelves 37 comprises an individual roller conveyer section extending perpendicular to the distributor conveyer sections 30 and 31. Thus, it is an easy matter to drive a meat loaded pallet from the distributor conveyer sections 30 and 31 and unto one of the storage shelves 37, such movement being handled by an operator in the meat cooler. Depending upon the amount of meat to be handled at any one time, there may or may not be a person manning the meat cooler for after the person completes the various tasks in the meat handling room he could complete the storage operation by handling the meat cooler room operation. However, if a large shipment of meat is to be received, it may be expedient to have at all times a man in the meat cooler as well as a man in the meat handling room.

As may be seen more particularly in FIG. 1, the lower run 16 of the conveyer 12 also is associated with distributor conveyer sections and storage shelves directly below those illustrated in FIG. 2. However, there would be one exception in that there would not be provided a connecting conveyer section like that of 32 under normal circumstances, although such a section could be provided if so desired. It should be further appreciated that any number of levels of conveyer runs and shelves could be provided in a meat cooler for the additional storage and handling of meat and meat loaded pallets.

When it is desired to further divide the primal pieces of meat into salable units such as roasts, chops, steaks and the like, a pallet of primal pieces would be removed from the meat cooler room and through the opening 14 to a conveyer section 38, FIGS. 1 and 2, which extends perpendicular to the conveyer 12 and adjacent the wall 27 of the meat cooler room but is positioned in the meat handling room. The pallet would be driven along the section 38 and to a meat saw 39 that may be of a smaller size than the meat saw 21. The primal pieces are successively unloaded from the pallet and unto a movable table 40 and cut into smaller pieces. The salable units may then be moved to a trimming table 41 which extends along the meat cooler wall 27 and directly adjacent to the meat saw 39. The salable units may then be trimmed, if necessary, and placed on trays to be returned to the cooler through the door 34 to the blooming table 36. After the units have regained their color, they may then be removed from the meat cooler, wrapped, weighed and priced for display to be sold or they may be directly placed into a meat display cabinet.

In order to facilitate the transfer of the meat products from a transporting vehicle to the conveyer 12 at the loading entrance 13 to the meat handling room, a portable roller conveyer section 42, FIGS. 5 and 6, may be used. As would normally be the case, a refrigerated truck 43 would enter an unloading dock or area outside of the store adjacent to the loading entrance 13 of the meat handling room. Normally a door would close the entrance 13 and the inlet end of the conveyer 12 from the unloading area. The truck 43 would align its unloading platform 44 or unloading door of the truck adjacent to the loading entrance 13. The portable conveyer section 42 would be aligned therewith such as illustrated in FIG. 6, whereupon pallets would be provided the truck driver for loading the basic meat units unto the portable conveyer section and for subsequent transfer to the conveyer 12. The portable conveyer section includes a rectangular frame 45 having rectangularly connected sections 46, 47, 48 and 49. At each corner of the frame, an upstanding leg is provided as designated by the numerals 50, 51, 52 and 53. At the lower end of each leg, a caster 54 is provided to facilitate movement of the conveyer section along its supporting surface.

The legs 52 and 53 include lower sections 52a and 53a rigidly secured to the rectangular frame 45 and upper movable and adjustable sections 52b and 53b that may be suitably adjustably secured to the lower sections by means of nut and bolt units 55, wherein a slot being provided in the fixed sections 52a and 53a would permit vertical adjustment of the sections 52b and 53b. Adjacent the upper opposite ends of the sections 52b and 53b, there is provided pins 56a for pivotally mounting one end of a roller conveyer section 56. It is this end which would be placed adjacent to and at the same height as the unloading platform of a refrigerated truck. The other end of the roller conveyer section 56 may attain one of two positions, that of resting on the rectangular frame 45 as shown in FIGS. 5 and 6 or that of being secured in an upper position by pins 57 engaging under bars 58 mounted along the side flange rails of the conveyer section 56. The roller conveyer section is shown in its upper position in dotted lines in FIG. 6. When the roller conveyer section 56 is in the lower position and resting on the frame 45, meat products may be delivered from the truck to the lower run 16 of the conveyer 12. While when the conveyer section 56 is in its upper position, meat products may be delivered to the upper run 15 of the conveyer 12. The positioning of the rectangular frame 45 relative to the legs is such as to permit alignment with the outlet end of the conveyer section 56 and the inlet end of the lower run 16 of the conveyer 12, while the securing of the conveyer section 56 in the upper position is such as to align the outlet end of the conveyer section with the inlet end of the upper run 15 of the conveyer 12.

From the foregoing, it is seen that the present invention provides improved method and apparatus for handling meat deliveries at a retail store which will reduce the manpower and handling of meat products and ultimately the cost of operating the store.

It will be understood that modifications and variations may be effected without departing from the scope of the novel concepts of the present invention, but it is understood that this application is to be limited only by the scope of the appended claims.

The invention is hereby claimed as follows:

1. A method of handling meat products between a transporting vehicle and a meat cooler including the weighing and cutting thereof in a meat handling room, said method comprising the continuous and uninterrupted handling of the meat products between the vehicle and the cooler including the steps of, conveying the meat from the vehicle and into the meat handling room, weighing the meat, cutting the meat into primal cuts, and conveying the cut meat from the meat handling room and into the cooler for storage therein.

2. A method of handling meat products between a transporting vehicle and a meat cooler including the weighing and cutting thereof in a meat handling room, said method comprising the continuous and uninterrupted handling of the meat products between the vehicle and the cooler including the steps of, conveying a basic meat unit from the vehicle and into the meat handling room, weighing the basic meat unit in the meat handling room, cutting the basic meat unit in the meat handling room into primal meat cuts, and conveying the primal meat cuts from the meat handling room and into the cooler for storage therein.

References Cited in the file of this patent

UNITED STATES PATENTS

| | | |
|---|---|---|
| 1,837,514 | Agar | Dec. 22, 1931 |
| 2,096,256 | Mitchell | Oct. 19, 1937 |
| 2,114,365 | Baker | Apr. 19, 1938 |
| 2,812,792 | Allbright | Nov. 12, 1957 |
| 2,964,155 | Flowers et al. | Dec. 13, 1960 |
| 2,969,099 | Gillman | Jan. 24, 1961 |
| 2,970,682 | Fisk | Feb. 7, 1961 |

FOREIGN PATENTS

| | | |
|---|---|---|
| 63,766 | Norway | July 28, 1941 |